US 11,320,900 B2

(12) United States Patent
Mor

(10) Patent No.: US 11,320,900 B2
(45) Date of Patent: May 3, 2022

(54) CURRENT DRAIN REDUCTION IN AR/VR DISPLAY SYSTEMS

(71) Applicant: Magic Leap, Inc., Plantation, FL (US)

(72) Inventor: Tal Mor, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/448,402

(22) Filed: Mar. 2, 2017

(65) Prior Publication Data

US 2017/0255259 A1  Sep. 7, 2017

Related U.S. Application Data

(60) Provisional application No. 62/304,098, filed on Mar. 4, 2016.

(51) Int. Cl.
| | |
|---|---|
| *G06F 3/01* | (2006.01) |
| *G06F 1/3234* | (2019.01) |
| *G06F 1/3231* | (2019.01) |
| *G06F 3/03* | (2006.01) |
| *G09G 3/34* | (2006.01) |
| *G09G 3/36* | (2006.01) |

(52) U.S. Cl.
CPC ............ *G06F 3/013* (2013.01); *G06F 1/3231* (2013.01); *G06F 1/3265* (2013.01); *G06F 3/0304* (2013.01); *G09G 3/3406* (2013.01); *G09G 3/3648* (2013.01); *G09G 2330/021* (2013.01); *G09G 2340/0435* (2013.01); *G09G 2354/00* (2013.01); *Y02D 10/00* (2018.01)

(58) Field of Classification Search
None
See application file for complete search history.

(56) References Cited

U.S. PATENT DOCUMENTS

| | | |
|---|---|---|
| 6,388,639 B1 | 5/2002 | Hoshino et al. |
| 6,850,221 B1 | 2/2005 | Tickle |
| D514,570 S | 2/2006 | Ohta |
| 8,437,513 B1 | 5/2013 | Derakhshani et al. |
| 8,950,867 B2 | 2/2015 | Macnamara |
| 8,976,110 B2 | 3/2015 | Eskilsson et al. |

(Continued)

FOREIGN PATENT DOCUMENTS

| | | |
|---|---|---|
| EP | 0 849 959 | 6/1998 |
| EP | 3 109 689 | 12/2016 |

(Continued)

OTHER PUBLICATIONS

International Search Report and Written Opinion for PCT Application No. PCT/US17/20522, dated May 19, 2017.

(Continued)

*Primary Examiner* — Duane N Taylor, Jr.
(74) *Attorney, Agent, or Firm* — Knobbe, Martens, Olson & Bear, LLP

(57) ABSTRACT

In some embodiments, eye tracking is used on an AR or VR display system to determine if a user of the display system is blinking or otherwise cannot see. In response, current drain or power usage of a display associated with the display system may be reduced, for example, by dimming or turning off a light source associated with the display, or by configuring a graphics driver to skip a designated number of frames or reduce a refresh rate for a designated period of time.

44 Claims, 7 Drawing Sheets

(56) References Cited

U.S. PATENT DOCUMENTS

| | | | |
|---|---|---|---|
| 9,081,426 B2 | 7/2015 | Armstrong | |
| 9,207,760 B1 | 12/2015 | Wu et al. | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,489,044 B2 | 11/2016 | Fateh | |
| 9,547,174 B2 | 1/2017 | Gao et al. | |
| 9,606,622 B1 | 3/2017 | Brothers et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,649,527 B2 | 5/2020 | Mor | |
| 10,698,215 B2 | 6/2020 | Welch et al. | |
| 2004/0130680 A1 | 7/2004 | Zhou et al. | |
| 2006/0028436 A1 | 2/2006 | Armstrong | |
| 2006/0140166 A1 | 6/2006 | Albulet | |
| 2007/0081123 A1 | 4/2007 | Lewis | |
| 2010/0118019 A1 | 5/2010 | Cases et al. | |
| 2011/0075257 A1 | 3/2011 | Hua et al. | |
| 2011/0085700 A1 | 4/2011 | Lee | |
| 2011/0106025 A1 | 5/2011 | Hall et al. | |
| 2011/0182469 A1 | 7/2011 | Ji et al. | |
| 2011/0242661 A1 | 10/2011 | Simmonds | |
| 2012/0127062 A1 | 5/2012 | Bar-Zeev et al. | |
| 2012/0162549 A1 | 6/2012 | Gao et al. | |
| 2012/0242570 A1 | 9/2012 | Kobayashi | |
| 2013/0082922 A1 | 4/2013 | Miller | |
| 2013/0117377 A1 | 5/2013 | Miller | |
| 2013/0125027 A1 | 5/2013 | Abovitz | |
| 2013/0135196 A1* | 5/2013 | Park | G06F 3/01 345/156 |
| 2013/0208234 A1 | 8/2013 | Lewis | |
| 2013/0242262 A1 | 9/2013 | Lewis | |
| 2013/0257709 A1* | 10/2013 | Raffle | G06F 3/013 345/156 |
| 2013/0300652 A1 | 11/2013 | Raffle et al. | |
| 2013/0314793 A1 | 11/2013 | Robbins et al. | |
| 2014/0071539 A1 | 3/2014 | Gao | |
| 2014/0145914 A1 | 5/2014 | Latta et al. | |
| 2014/0177023 A1 | 6/2014 | Gao et al. | |
| 2014/0218468 A1 | 8/2014 | Gao et al. | |
| 2014/0247210 A1 | 9/2014 | Henderek et al. | |
| 2014/0267420 A1 | 9/2014 | Schowengerdt | |
| 2014/0306866 A1 | 10/2014 | Miller et al. | |
| 2014/0380249 A1 | 12/2014 | Fleizach | |
| 2015/0016777 A1 | 1/2015 | Abovitz et al. | |
| 2015/0029096 A1 | 1/2015 | Ishihara | |
| 2015/0061999 A1* | 3/2015 | Kim | G06F 3/013 345/156 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0235435 A1 | 8/2015 | Miller et al. | |
| 2015/0235456 A1 | 8/2015 | Schowengerdt | |
| 2015/0241967 A1 | 8/2015 | Saripalle et al. | |
| 2015/0248169 A1 | 9/2015 | Abovitz et al. | |
| 2015/0248788 A1 | 9/2015 | Abovitz et al. | |
| 2015/0248793 A1 | 9/2015 | Abovitz et al. | |
| 2015/0268415 A1 | 9/2015 | Schowengerdt et al. | |
| 2015/0268720 A1 | 9/2015 | Kobayashi | |
| 2015/0301599 A1 | 10/2015 | Miller | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0338915 A1* | 11/2015 | Publicover | G06K 9/0061 345/633 |
| 2015/0346490 A1 | 12/2015 | TeKolste et al. | |
| 2015/0346495 A1 | 12/2015 | Welch et al. | |
| 2015/0356781 A1 | 12/2015 | Miller | |
| 2016/0011419 A1 | 1/2016 | Gao | |
| 2016/0025971 A1 | 1/2016 | Crow et al. | |
| 2016/0026253 A1 | 1/2016 | Bradski et al. | |
| 2016/0043289 A1 | 2/2016 | Inomata et al. | |
| 2016/0048220 A1 | 2/2016 | Shen | |
| 2016/0062459 A1 | 3/2016 | Publicover et al. | |
| 2016/0085300 A1 | 3/2016 | Robbins et al. | |
| 2016/0109709 A1* | 4/2016 | Osterhout | G06F 3/03545 359/614 |
| 2016/0131905 A1 | 5/2016 | Takahashi et al. | |
| 2016/0133201 A1 | 5/2016 | Border et al. | |
| 2016/0270656 A1 | 9/2016 | Samec et al. | |
| 2017/0011210 A1 | 1/2017 | Cheong et al. | |
| 2017/0237974 A1 | 8/2017 | Samec et al. | |
| 2017/0276948 A1 | 9/2017 | Welch et al. | |
| 2017/0293356 A1 | 10/2017 | Khadeh et al. | |
| 2018/0039083 A1 | 2/2018 | Miller et al. | |
| 2019/0369724 A1 | 12/2019 | Mor | |
| 2020/0319466 A1 | 10/2020 | Welch | |
| 2020/0379553 A1 | 12/2020 | Mor | |
| 2021/0181514 A1 | 6/2021 | Martin | |

FOREIGN PATENT DOCUMENTS

| | | |
|---|---|---|
| JP | H08-271953 A | 10/1996 |
| JP | H11-249064 A | 9/1999 |
| JP | 2006-059147 A | 3/2006 |
| JP | 2009-267733 A | 11/2009 |
| JP | 2010-187132 A | 8/2010 |
| JP | 2012-022150 | 2/2012 |
| JP | 2012-022150 A | 2/2012 |
| JP | 2012-203127 | 10/2012 |
| JP | 2012-203127 A | 10/2012 |
| JP | 2013-162407 | 8/2013 |
| JP | 2013-162407 A | 8/2013 |
| JP | 2015-081313 | 4/2015 |
| JP | 2015-081313 A | 4/2015 |
| JP | 2015-205114 | 11/2015 |
| JP | 2015-205114 A | 11/2015 |
| JP | 2017-058853 | 3/2017 |
| JP | 2017-058853 A | 3/2017 |
| KR | 10-2012-0107949 | 10/2012 |
| KR | 10-2015-0099430 | 8/2015 |
| KR | 2015-0098162 A | 8/2015 |
| KR | 2015-0099430 | 8/2015 |
| WO | WO 2015/081313 | 6/2015 |
| WO | WO 2015/134740 | 9/2015 |
| WO | WO 2015/184412 | 12/2015 |
| WO | WO 2016/018487 | 2/2016 |
| WO | WO 2017/139667 | 8/2017 |
| WO | WO 2017/151974 | 9/2017 |
| WO | WO 2017/165848 | 9/2017 |
| WO | WO 2020/042654 | 1/2020 |

OTHER PUBLICATIONS

Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.

European Extended Search Report, re EP Application No. 17760851.0, dated Sep. 23, 2019.

International Preliminary Report on Patentability for PCT Application No. PCT/US17/20522, dated Sep. 4, 2018.

ARToolKit: https://web.archive.org/web/20051013062315/http://www.hiti,washington.edu:80/artoolkit/documentaton/hardware.htm, archived Oct. 13, 2005.

Azuma, "a Survey of Augmented Reality," Teleoperators and Virtual Environments 6, 4 (Aug. 1997), pp. 335-385. http://web.archive.

(56) References Cited

OTHER PUBLICATIONS org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting with Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

"Basic Psychological Process—B.Sc. in Counseling Psychology Core Course", University of Calicut, School of Distance Education, (2011 Admission onwards) in 189 pages. URL: http://www.universityofcalicut.info/syl/CP1B01BasicPsychologicalProcesses.pdf.

"Digital Mirror Fashion", GibamVision, retrieved Sep. 22, 2016, in 2 pages. URL: http://www.gibamvision.com/en/digital-mirror-fashion.

"How do I calculate total acceleration from the x, y, and z g-force values given by an accelerometer?", Quora, answered Dec. 28, 2015, accessed Jul. 11, 2017, in 4 pages. URL: https://www.quora.com/How-do-I-calculate-total-acceleration-from-the- -y-and-z-g-force-values-given-by-an-accelerometer.

"Research helps stroke victims retrain brain", Victoria University, Dec. 10, 2015, as archived Aug. 10, 2017, in 3 pages. URL: https://web.archive.org/web/20170810220140/https://www.vu.edu.au/news-events/media-releases/research-helps-stroke-victims-retrain-brain.

"Scientists Literally Stretch Brain to Map Details", Medgadget, Aug. 1, 2016, as archived Aug. 4, 2017, in 5 pages. URL: https://web.archive.org/web/20170804161858/https://www.medgadget.com/2016/08/scientists-stretch-brain.html.

"Transcranial Direct Current Stimulation Shown to Improve Learning Skills", Medgadget, Mar. 1, 2016, as archived Aug. 10, 2017, in 6 pages. URL: https://web.archive.org/save/_embed/https://www.medgadget.com/2016/03/transcranial-direct-current-stimulation-shown-improve-learning-skills.html.

"True Mirror®: See Yourself™", True Mirror, The True Mirror Company, Inc., 2015, accessed Jun. 30, 2016, in 3 pages. URL: http://www.truemirror.com/.

"True Mirrors" (homepage), True Mirror Company, as archived Aug. 17, 2017, in 2 pages. URL: https://web.archive.org/web/20170817144914/http://www.truemirror.com/.

"Eye Intensity Response, Contrast Sensitivity", Telescope-Optics.net, retrieved Jul. 11, 2017, in 14 pages. URL: http://www.telescope-optics.net/eye_intensity_response.htm.

"Eye Spectral Response", Telescope-Optics.net, retrieved Jul. 11, 2017, in 9 pages. URL: http://www.telescope-optics.net/eye_spectral_response.htm.

"The Telescopic Eye", Telescope-Optics.net, archived Jul. 21, 2016, in 5 pages. URL: https://web.archive.org/web/20160721003510/https://www.telescope-optics.net/eye.htm.

American Academy of Neurology (AAN), "Ultrasound headset may be new way to recognize concussion on the sidelines." ScienceDaily, Apr. 13, 2016, as archived Aug. 10, 2017, in 3 pages. URL: https://web.archive.org/web/20170810201930/https://www.sciencedaily.com/releases/2016/04/1604131 83041.htm.

Anthony, S., "MIT releases open-source software that reveals invisible motion and detail in video", Extreme Tech, Feb. 28, 2013, as accessed Aug. 4, 2017, in 5 pages.

Butler, D. et al., "Mirror, Mirror, on the Wall, How Does My Brain Recognize My Image at All?" PLoS One, vol. 7, Issue 2, 2012, published online Feb. 16, 2012, in 11 pages. URL: http://www.ncbi.nlm.nih.gov/pmc/articles/PMC3281068.

Carter, T. et al., "UltraHaptics: Multi-Point Mid-Air Haptic Feedback for Touch Surfaces", UIST '13 Proceedings of the 26th Annual ACM Symposium on User Interface Software and Technology, Oct. 2013, in 10 pages. URL: http://big.cs.bris.ac.uk/wp-content/uploads/2013/10/Ultrahaptics.Carter.2013.pdf.

CNRS, "Learning to read: Tricking the brain," ScienceDaily, Aug. 28, 2014, in 3 pages. URL: http://www.sciencedaily.com/releases/2014/08/140828115248.htm.

Curawave: "About The Curawave (MRgFUS) Treatment", Curawave, as archived Aug. 16, 2017, in 4 pages. URL: https://web.archive.org/web/20170816232429/http://USA.uterine-fibroids.org/about-mrgfus/.

Economic and Social Research Council, "How can we still read words when the letters are jumbled up?" ScienceDaily, Mar. 15, 2013, in 2 pages. URL: https://www.sciencedaily.com/releases/2013/03/130315074613.htm.

Fotopoulou, A. et al., "Mirror-view reverses somatoparaphrenia: dissociation between first- and third-person perspectives on body ownership", Neuropsychologia, vol. 49, Dec. 2011, in 10 pages. URL: http://www.ncbi.nlm.nih.gov/pubmed/22023911.

Gilliam, C., "Can VR Justify QHD and 4K Displays?", DA Developers, Feb. 11, 2015, as archived Aug. 4, 2017, in 7 pages. URL:https://web.archive.org/web/20170804164547/https://www.da-developers.com/can-vr-justify-qhd-and-4k-displays/.

Green, M., "Night Vision", Visual E pert, as archived Aug. 4, 2017, in 9 pages. URL: https://web.archive.org/web/20170804160954/http://www.visuale pert.com/Resources/nightvision.html.

Griffith, D., "'Digital neurotherapeutic' developed at UC Davis Mind Institute", Daily Democrat, Jun. 24, 2016, as archived Aug. 3, 2017, in 3 pages. URL: https://web.archive.Org/web/20170803232850/http://www.dailydemocrat.com/genera!-news/20160624/digital-neurotherapeutic-developed-at-uc-davis-mind-institute.

Harrison, W., "Eye movement targets are released from visual crowding", Will J Harrison, Mar. 13, 2013, as archived Aug. 4, 2017, in 3 pages. URL: https://web.archive.org/web/20170804165524/http://willjharrison.com/2013/03/eye-movement-targets-are-released-from-visual-crowding/.

Ibsen, S. et al., "Sonogenetics is a non-invasive approach to activating neurons in Caenorhabditis elegans", Nature Communications, Sep. 15, 2015, in 12 pages. URL: http://www.nature.com/ncomms/2015/150915/ncomms9264/full/ncomms9264.html.

Intel: "Retail Solution Configuration: Memory Mirror Solution", Intel, printed Sep. 25, 2015, in 3 pages. URL: http://www.intel.com/content/www/US/en/retail/nrf-2014/memory.html?wapkw=mi.

Iosa, M. et al., "Seven Capital Devices for the Future of Stroke Rehabilitation", Stroke Research and Treatment, vol. 2012, Nov. 2012, in 9 pages. URL: http://www.ncbi.nlm.nih.gov/pmc/articles/PMC3530851/.

Jurcina, K., "clinApp- Prism Adaptation", YouTube, published Dec. 7, 2015, as archived Sep. 8, 2017, in 10 pages (with video transcription). URL: https://web.archive.org/web/20170908195617/https://www.youtube.com/watch?v=k1 K5qV678wQ.

Khan Academy: "The effects of ultrasound on different tissue types", Khan Academy, as archived Aug. 11, 2017, in 9 pages. URL: https://web.archive.org/web/20170811162328/https://www.khanacademy.org/test-prep/mcat/physical-sciences-practice/physical-sciences-practice-tut/e/the-effects-of-ultrasound-on-different-tissue-types.

Kolb, H., "Part XIII: Facts and Figures concerning the human retina by Helga Kolb", Webvision, archived Jul. 2, 2016, in 5 pages. URL: https://web.archive.org/web/20160702134518/http://webvision.med.utah.edu/book/part-xiii-facts-and-figures-concerning-the-human-retina/.

Le, et al., "Robust and Accurate Skeletal Rigging from Mesh Sequences," ACM Transactions on Graphics (TOG), vol. 33(4), pp. 84-93, Jul. 2014.

Matsumoto, J., "I was recently diagnosed with parkinsonism. What causes it, and how can I cope as it progresses?", Mayo Clinic, as

(56) References Cited

OTHER PUBLICATIONS archived Aug. 11, 2017, in 3 pages. URL: https://web.archive.org/web/20170811161634/http://www.mayoclinic.org/diseases-conditions/parkinsons-disease/e pert-answers/parkinsonism/faq-20058490.

Milde, C. et al., "Do Mirror Glasses Have the Same Effect on Brain Activity as a Mirror Bo ? Evidence from a Functional Magnetic Resonance Imaging Study with Healthy Subjects", PLoS One, vol. 10, Issue. 5, published online May 27, 2015, in 13 pages. URL: http://www.ncbi.nlm.nih.gov/pmc/articles/PMC4446290/.

Millenniumdroid, "True Mirror - Android Apps on Google Play", Google Play Store, retrieved Jun. 30, 2016, in 2 pages. URL: https://play.google.com/store/apps/details?id=com.blogspot.mdroid.mymirror&hl=en.

ModernNeurology, "Binocular Stereoscopic Depth Perception", YouTube, published Mar. 15, 2016, as archived Sep. 8, 2017, in 11 pages (with video transcription). URL: https://web.archive.org/web/20170906181457/https://www.youtube.com/watch?v=NarhP8PAdyc&feature=youtube&app=desktop.

Morries, L. et al., "Treatments for traumatic brain injury with emphasis on transcranial near-infrared laser phototherapy", Neuropsychiatric Disease and Treatment, vol. 11, Aug. 2015, in 17 pages. URL: http://www.ncbi.nlm.nih.gov/pubmed/26347062.

Mrovlje, J. et al., "Distance measuring based on stereoscopic pictures", 9th International PhD Workshop on Systems and Control: Young Generation Viewpoint, Oct. 2008, in 6 pages. URL: http://dsc.ijs.si/files/papers/S101 %20Mrovlje.pdf.

Plataforma SINC, "Through the looking glass: Research into brain's ability to understand mirror-image words sheds light on dysle ia," ScienceDaily, Mar. 31, 2011, in 3 pages. URL: https://www.sciencedaily.com/releases/2011/03/110331080037.htm.

Podda, M. et al., "Anodal transcranial direct current stimulation boosts synaptic plasticity and memory in mice via epigenetic regulation of Bdnf e pression", Scientific Reports, Feb. 24, 2016, in 19 pages. URL: http://www.nature.com/articles/srep22180.

Preston, C. et al., "Owning the body in the mirror: The effect of visual perspective and mirror view on the full-body illusion", Scientific Reports, vol. 5, published online Dec. 17, 2015, in 13 pages. URL: http://www.ncbi.nlm.nih.gov/pmc/articles/PMC4683587/.

Pullen, L., "Brain Therapy Helps Rehabilitate Stroke Patients", Medscape, Dec. 5, 2013, in 10 pages. URL: http://www.medscape.com/viewarticle/815458.

Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtube.

Rutkin, A., "Digital mirror reveals what lies under your skin", New Scientist, Apr. 15, 2014, in 3 pages. URL: https://www.newscientist.com/article/mg22229653-800-digital-mirror-reveals-what-lies-under-your-skin/.

Searle, R., "10 Crazy Facts About Mirrors," ListVerse, Dec. 30, 2013, in 11 pages. URL: http://listverse.com/2013/12/30/10-crazy-facts-about-mirrors/.

Szegedy et al., "Going deeper with convolutions", arXiv:1409.4842v1, Sep. 17, 2014 in 12 pages.

The New York Times, "MIT Computer Program Reveals Invisible Motion in Video The New York Times", YouTube, published Feb. 27, 2013, as archived Sep. 8, 2017, in 10 pages (with video transcription). URL: https://web.archive.org/web/20170906180629/https://www.youtube.com/watch?feature=youtu.be&t=1m5s&y=3rWycBEHn3s&app=desktop.

Wang, W. et al., "Neural Interface Technology for Rehabilitation: E ploiting and Promoting Neuroplasticity", Physical Medicine Rehabilitation Clinics of North America, vol. 21, Feb. 2010, in 22 pages. URL: http://www.ncbi.nlm.nih.gov/pmc/articles/PMC2788507/.

Wikipedia: "Adaptation", Wikipedia, printed Jul. 11, 2017, in 9 pages. URL: https://en.wikipedia.org/wiki/Adaptation_(eye).

Wikipedia: "Atomic Mirror", Wikipedia, printed Dec. 13, 2016, in 2 pages. URL: http/en.wikipedia.org/wiki/Atomic_mirror.

Wikipedia: "Body transfer illusion", Wikipedia, as archived Aug. 10, 2017, in 4 pages. URL: https://web.archive.org/web/20170810213201/https://en.wikipedia.org/wiki/Body_transfer_illusion.

Wikipedia: "Mirror Neuron", Wikipedia, printed Jun. 30, 2016, in 17 pages. URL: https://en.wikipedia.org/wiki/Mirror_neuron.

Wikipedia: "Non-reversing mirror," Wikipedia, printed Jun. 30, 2016, in 2 pages. URL: https://en.wikipedia.org/wiki/Non-reversing_mirror.

Wikipedia: "Parkinsonism", Wikipedia, as archived Aug. 10, 2017, in pages. URL: https://web.archive.org/web/20170810214355/https://en.wikipedia.org/wiki/Parkinsonism.

Wikipedia: "Peripheral vision", Wikipedia, as archived Aug. 3, 2017, in 6 pages. URL: https://web.archive.org/web/20170803223449/https://en.wikipedia.org/wiki/Peripheral_vision.

"Positron emission tomography", Wikipedia, as archived Aug. 3, 2017, in 14 pages. URL: https://web.archive.org/web/20170803232043/https://en.wikipedia.org/wiki/Positron_emission_tomography.

Wikipedia: "Prism adaptation", Wikipedia, as archived Aug. 10, 2017, in 5 pages. URL: https://web.archive.org/web/20170810213634/https://en.wikipedia.org/wiki/Prism_adaptation.

Zult, T. et al., "Mirror illusion reduces motor cortical inhibition in the ipsilateral primary motor corte during forceful unilateral muscle contractions", Journal of Neurophysiology, vol. 113, Issue 7, Apr. 2015, published online Jan. 28, 2015, in 14 pages. URL: http://www.ncbi.nlm.nih.gov/pmc/articles/PMC4416555/.

\* cited by examiner

CURRENT DRAIN REDUCTION IN AR/VR DISPLAY SYSTEMS

CROSS-REFERENCE TO RELATED APPLICATIONS

This application claims the benefit of U.S. Provisional Application No. 62/304,098, filed Mar. 4, 2016, which is hereby incorporated by reference in its entirety.

BACKGROUND

Field

The present disclosure relates to virtual reality and augmented reality imaging and visualization systems and more particularly to power management in virtual reality and augmented reality systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY

The systems, methods and devices of this disclosure each have several innovative aspects, no single one of which is solely responsible for the desirable attributes disclosed herein. A variety of example systems and methods are provided below.

Embodiment 1

A display system with reduced power use, comprising:
an inward-facing sensor;
a display; and
processing electronics in communication with the inward-facing sensor and the display, the processing electronics configured to:
detect a change in a user's eye status using the inward facing sensor, and
reduce a current drain of the display system based on when the change in the user's eye status is detected.

Embodiment 2

The display system of Embodiment 1, wherein the change in the user's eye status is a blink or a saccade.

Embodiment 3

The display system of any of the Embodiments 1-2, wherein the display comprises a light source, and wherein reducing a current drain of the display comprises dimming the light source of the display.

Embodiment 4

The display system of any of the Embodiments 1-2, wherein the display comprises a light source, and wherein reducing a current drain of the display comprises turning off the light source.

Embodiment 5

The display system of any of the Embodiments 1-4, wherein reducing a current drain of the display comprises configuring a graphics driver associated with the display to reduce an amount of power consumed by the display.

Embodiment 6

The display system of Embodiment 5, wherein the graphics driver is configured to skip a designated number of frames, the designated number of frames based upon a length of time that the eye blinks or saccades.

Embodiment 7

The display system of any of the Embodiments 1-6, wherein the display comprises an LCD display.

Embodiment 8

The display system of any of the Embodiments 1-7, wherein the display system comprises an augmented reality or a virtual reality display.

Embodiment 9

The display system of any of the Embodiments 1-8, wherein the inward-facing sensor comprises a camera.

Embodiment 10

The display system of any of the Embodiments 1-9, wherein the inward-facing sensor comprises an eye-tracking camera.

Embodiment 11

The display system of any of the Embodiments 1-10, wherein the processing electronics is configured to reduce the current drain of the display by reducing a refresh rate associated with the display.

Embodiment 12

The display system of any of the Embodiments 1-11, further comprises a graphics driver wherein reducing the current drain of the display system comprises reducing the power consumption of a graphics driver.

Embodiment 13

A method for reducing power use of a display system, comprising:
detecting a change in a user's eye status using an inward facing sensor, and
reducing a current drain of the display system based on when the change in the user's eye status is detected.

Embodiment 14

The method of Embodiment 13, wherein the change in the user's eye status is a blink or saccade.

Embodiment 15

The method of any of the Embodiments 13-14, wherein the display system comprises a light source, and wherein reducing a current drain of the display system comprises dimming the light source of the display system.

Embodiment 16

The method of any of the Embodiments 13-14, wherein the display system comprises a light source, and wherein reducing a current drain of the display system comprises shutting off the light source of the display.

Embodiment 17

The method of any of the Embodiments 13-16, wherein reducing a current drain of the display system comprises configuring a graphics driver associated with the display system to reduce an amount of power consumed by the display system.

Embodiment 18

The method of Embodiment 17, wherein the graphics driver is configured to skip a designated number of frames, the designated number of frames based upon a length of a blink or length of time the eye cannot see.

Embodiment 19

The method of any of Embodiment 17, wherein the graphics driver is configured to reduce an amount of power consumed by the display system for a designated period of time, based upon a length of a blink or length of time the eye cannot see.

Embodiment 20

The method of any of the Embodiments 13-19, wherein the display system comprises an LCD display.

Embodiment 21

The method of any of the Embodiments 13-20, wherein the display system comprises an augmented reality or a virtual reality display.

Embodiment 22

The method of any of the Embodiments 13-21, wherein the inward-facing sensor comprises an eye-tracking camera.

Embodiment 23

The method of any of the Embodiments 13-22, wherein reducing the current drain of the display system comprises reducing a refresh rate associated with the display.

Embodiment 24

The method of any of the Embodiments 13-23, wherein reducing the current drain of the display system comprises reducing the power consumption of a graphics driver.

Embodiment 25

A display system comprising:
an inward-facing camera;
a display; and
hardware processing electronics in communication with the inward-facing camera and the display, the hardware processing electronics programmed to:
using the camera determine when a user of the display is blinking; and
in response to a determination that the user is blinking, reducing a current drain of the display system.

Embodiment 26

The display system of Embodiment 25, wherein the display comprises a light source, and wherein reducing a current drain of the display comprises dimming the light source of the display.

Embodiment 27

The display system of any of the Embodiments 25-26, wherein the light source comprises a backlight.

Embodiment 28

The display system of any of the Embodiments 25-27, wherein reducing a current drain of the display comprises configuring a graphics driver associated with the display to reduce an amount of power consumed by the display.

Embodiment 29

The display system of Embodiment 28, wherein the graphics driver is configured to skip a designated number of frames, the designated number of frames based upon a length of a blink.

Embodiment 30

The display system of Embodiment 28, wherein the graphics driver is configured to reduce an amount of power consumed by the display for a designated period of time, based upon a length of a blink.

Embodiment 31

The display system of any of the Embodiments 25-30, wherein the display comprises an LCD display.

Embodiment 32

The display system of any of the Embodiments 25-31, wherein the display comprises an augmented reality or a virtual reality display.

Embodiment 33

A method for reducing current drain in a display, comprising:
using an inward-facing camera to determine when a user of the display system is blinking; and
in response to a determination that the user is blinking, reducing a current drain of the display.

Embodiment 34

The method of Embodiment 33, wherein the display comprise a light source, and wherein reducing a current drain of the display comprises dimming the light source of the display.

Embodiment 35

The method of Embodiment 34, wherein the light source comprises a backlight.

Embodiment 36

The method of any of the Embodiments 33-35, wherein reducing a current drain of the display comprises configuring a graphics driver associated with the display to reduce an amount of power consumed by the display.

Embodiment 37

The method of Embodiment 36, wherein the graphics driver is configured to skip a designated number of frames, the designated number of frames based upon a length of a blink.

Embodiment 38

The method of Embodiment 36, wherein the graphics driver is configured to reduce an amount of power consumed by the display for a designated period of time, based upon a length of a blink.

Embodiment 39

The method of any of the Embodiments 33-38, wherein the display comprises an LCD display.

Embodiment 40

The method of any of the Embodiments 33-39, wherein the display comprises an augmented reality or a virtual reality display.

Embodiment 41

The method of any of the Embodiments 33-40, wherein the camera comprises an eye-tracking camera.

Embodiment 42

The display system of any of the Embodiments 25-32, wherein the camera comprises an eye-tracking camera.

Embodiment 43

The display system of any of the Embodiments 1-12, wherein the display comprises a head mounted display.

Embodiment 44

The display system of any of the Embodiments 1-12 or 43, further comprising a frame configured to support the display in front of the user's eye.

Embodiment 45

The display system of any of the Embodiments 1-12 or 43-44, wherein the display system comprises an AR or VR system configured to provide image content to the user with different amounts of divergence, such that the image content appears to the user to be located at different depths.

Embodiment 46

The method of any of the Embodiments 13-23, wherein the display system comprises a head mounted display.

Embodiment 47

The method of any of the Embodiments 13-23 or 46, wherein the display system further comprises a frame configured to support the display in front of the user's eye.

Embodiment 48

The method of any of the Embodiments 13-23 or 46-47, wherein the display system comprises an AR or VR system configured to provide image content to the user with different amounts of divergence, such that the image content appears to the user to be located at different depths.

BRIEF DESCRIPTION OF THE DRAWINGS

It will be appreciated that the drawings are provided to illustrate example embodiments and are not intended to limit the scope of the disclosure. Like reference numerals refer to like features throughout.

DETAILED DESCRIPTION

Example Display Systems

Figure 1:
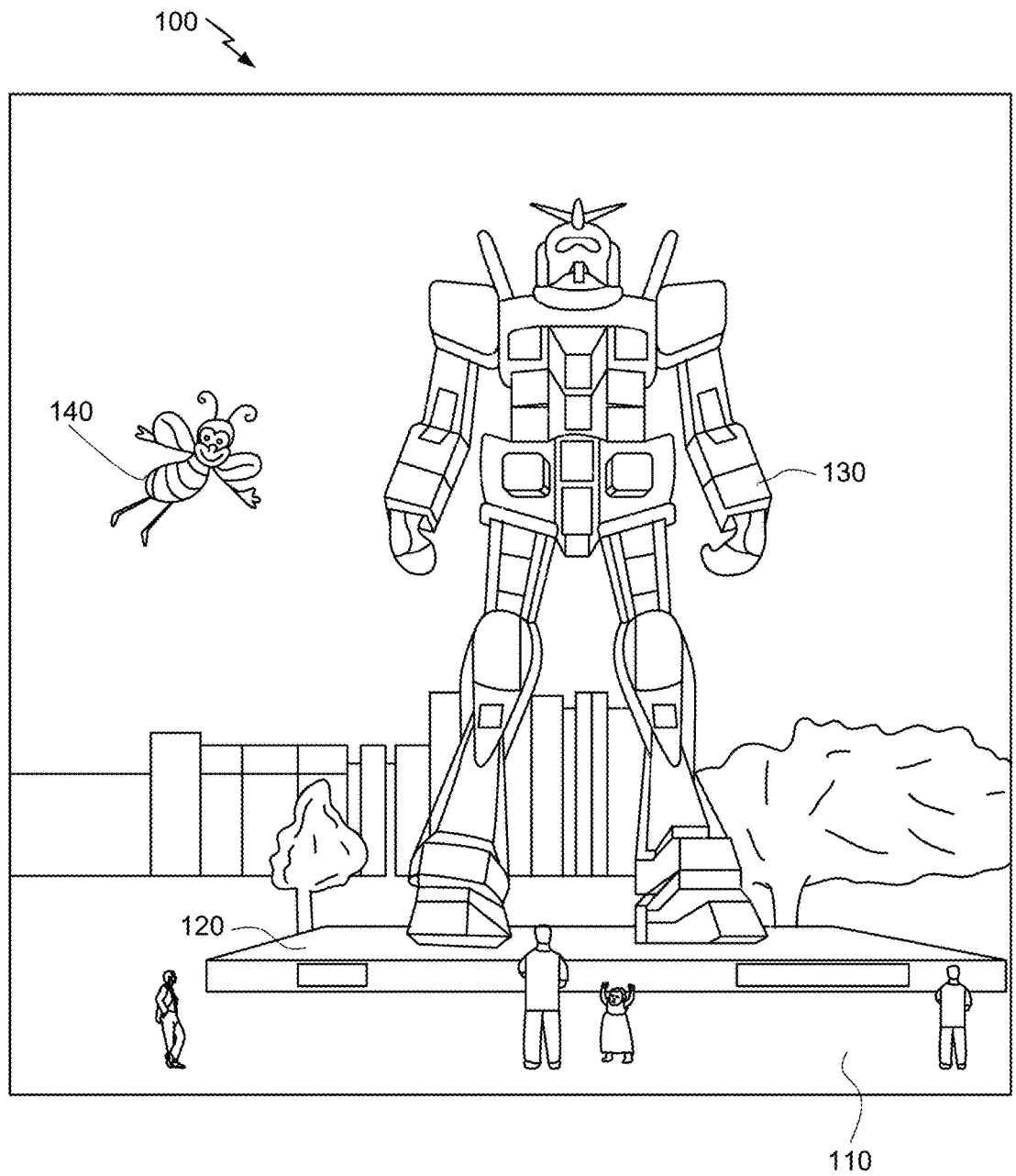
FIG. 1 illustrates a user's view of augmented reality (AR) through an AR device.

With reference to FIG. 1, an augmented reality scene 100 is depicted. It will be appreciated that modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. FIG. 1 shows an example of such a scene in which a user of an AR technology sees a real-world park-like setting 110 featuring people, trees, buildings in the background, and a concrete platform 120. In addition to these items, the user of the AR technology also perceives that he "sees" a robot statue 130 standing upon the real-world platform 120, and a cartoon-like avatar character 140 flying by which seems to be a personification of a bumble bee, even though these elements 130, 150 do not exist in the real world. Because the human visual perception system is complex, it is challenging to produce a VR or AR technology that facilitates a comfortable, natural-feeling, rich presentation of virtual image elements amongst other virtual or real-world imagery elements.

Figure 2:
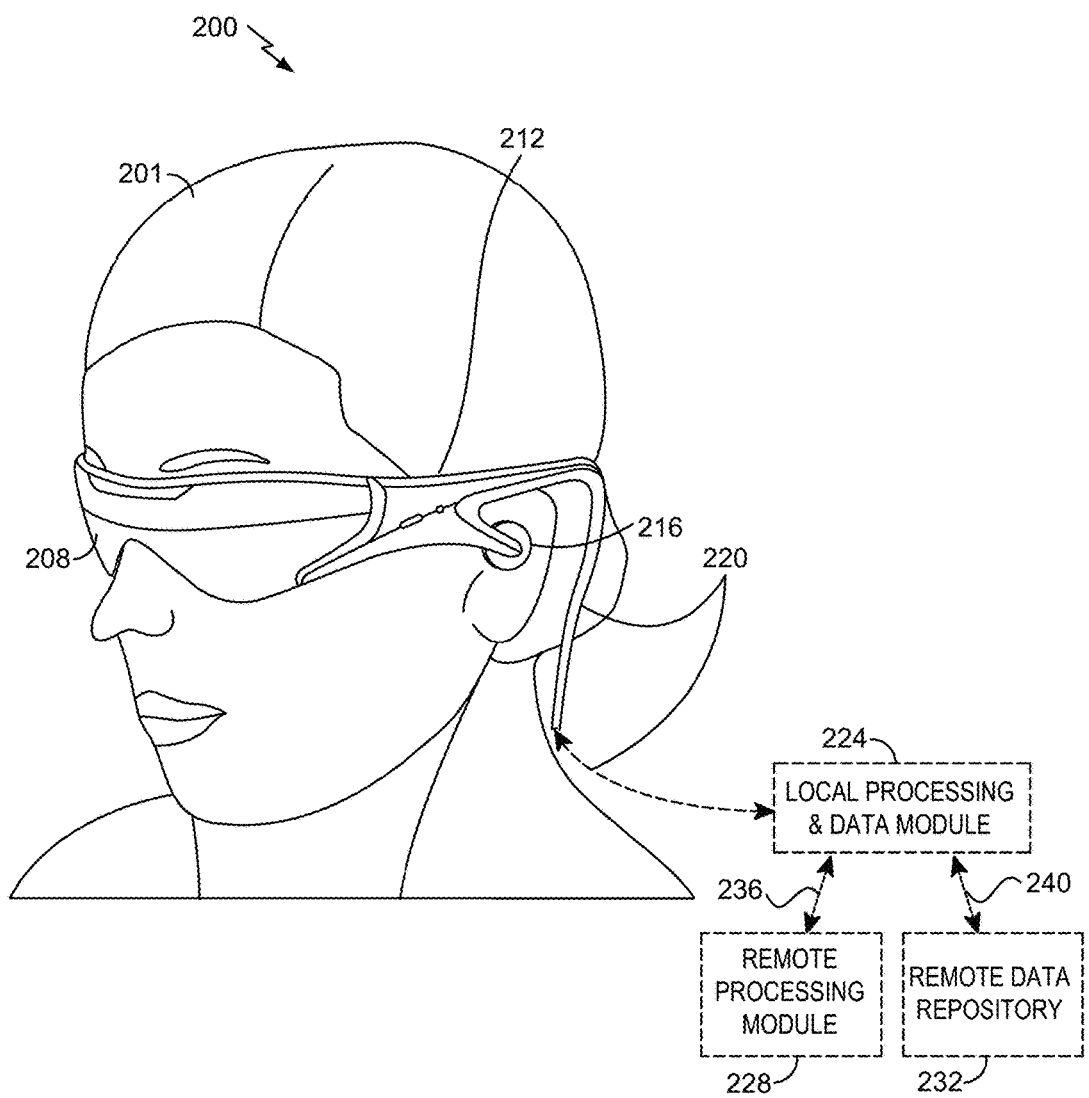
FIG. 2 illustrates an example of wearable display system.

FIG. 2 illustrates an example of wearable display system 200. The display system 200 includes a display 208, and various mechanical and electronic modules and systems to support the functioning of that display 208. The display 208 may be coupled to a frame 212, which is wearable by a display system user or viewer 201 and which is configured to position the display 208 in front of the eyes of the user 201. The display 208 may be considered eyewear in some embodiments. In some embodiments, a speaker 216 is coupled to the frame 212 and positioned adjacent the ear canal of the user 201 (in some embodiments, another speaker, not shown, is positioned adjacent the other ear canal of the user to provide for stereo/shapeable sound control). In some embodiments, the display system may also include one or more microphones (not shown) or other devices to detect sound. In some embodiments, the microphone is configured to allow the user to provide inputs or commands to the system 200 (e.g., the selection of voice menu commands, natural language questions, etc.) and/or may allow audio communication with other persons (e.g., with other users of similar display systems).

With continued reference to FIG. 2, the display 208 is operatively coupled, such as by a wired lead or wireless connectivity, to a local data processing module 224 which may be mounted in a variety of configurations, such as fixedly attached to the frame 212, fixedly attached to a helmet or hat worn by the user, embedded in headphones, or otherwise removably attached to the user 201 (e.g., in a backpack-style configuration, in a belt-coupling style configuration). The local processing and data module 224 may comprise a hardware processor or processing electronics or circuitry, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 212 or otherwise attached to the user 201), such as image capture devices (such as cameras), microphones, inertial measurement units, accelerometers, compasses, GPS units, radio devices, and/or gyros; and/or b) acquired and/or processed using remote processing module 228 and/or remote data repository 232, possibly for passage to the display 208 after such processing or retrieval. The local processing and data module 224 may be operatively coupled by communication links 236, 240, such as via a wired or wireless communication links, to the remote processing module 228 and remote data repository 232 such that these remote modules 228, 232 are operatively coupled to each other and available as resources to the local processing and data module 224. In some embodiments, the local processing and data module 224 may include one or more of the image capture devices, microphones, inertial measurement units, accelerometers, compasses, GPS units, radio devices, and/or gyros. In some other embodiments, one or more of these sensors may be attached to the frame 212, or may be stand alone structures that communicate with the local processing and data module 224 by wired or wireless communication pathways.

With continued reference to FIG. 2, in some embodiments, the remote processing module 228 may comprise one or more processors or processing electronics or circuitry configured to analyze and process data and/or image information. In some embodiments, the remote data repository 232 may comprise a digital data storage facility, which may be available through the internet or other networking configuration in a "cloud" resource configuration. In some embodiments, the remote data repository 232 may include one or more remote servers, which provide information, e.g., information for generating augmented reality content, to the local processing and data module 224 and/or the remote processing module 228. In some embodiments, all data is stored and all computations are performed in the local processing and data module, allowing fully autonomous use from a remote module.

Figure 3:
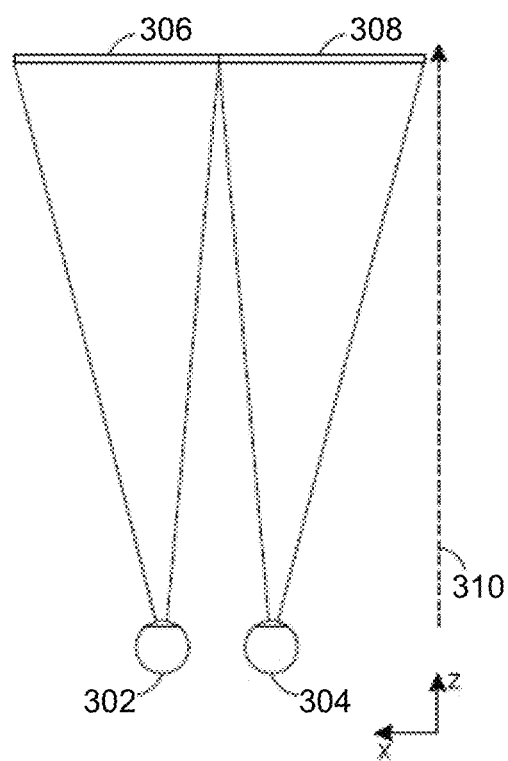
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 306, 308—one for each eye 302, 304—are outputted to the user. The images 306, 308 are spaced from the eyes 302, 304 by a distance 310 along an optical or z-axis parallel to the line of sight of the viewer. The images 306, 308 are flat and the eyes 302, 304 may focus on the images by assuming a single accommodated state. Such systems rely on the human visual system to combine the images 306, 308 to provide a perception of depth for the combined image.

It will be appreciated, however, that the human visual system is more complicated and providing a realistic perception of depth is more challenging. For example, without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, a change in vergence of the eyes when shifting attention from one object to another object at a different distance will automatically cause a matching change in the focus of the lenses of the eyes, or accommodation of the eyes, under a relationship known as the "accommodation-vergence reflex." Likewise, a change in accommodation will trigger a matching change in vergence, under normal conditions. As noted herein, many stereoscopic or "3-D" display systems display a scene using slightly different presentations (and, so, slightly different images) to each eye such that a three-dimensional perspective is perceived by the human visual system. Such systems can be uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
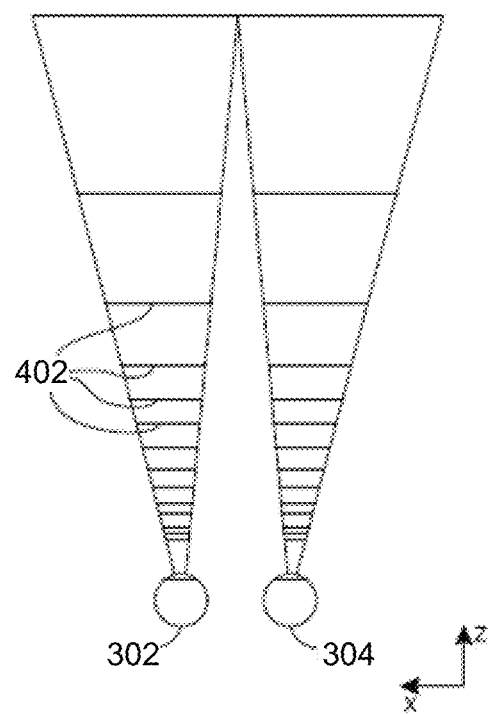
FIG. 4 illustrates aspects of an approach for simulating three-dimensional imagery using multiple depth planes.

FIG. 4 illustrates aspects of an approach for simulating three-dimensional imagery using multiple depth planes. Objects at various distances from eyes 302, 304 on the z-axis are accommodated by the eyes 302, 304 so that those objects are in focus. The eyes (302 and 304) assume particular accommodated states to bring into focus objects at different distances along the z-axis. Consequently, a particular accommodated state may be said to be associated with a particular one of depth planes 402, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302, 304, and also by providing different presentations of the image corresponding to each of the depth planes. While shown as being separate for clarity of illustration, it will be appreciated that the fields of view of the eyes 302, 304 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
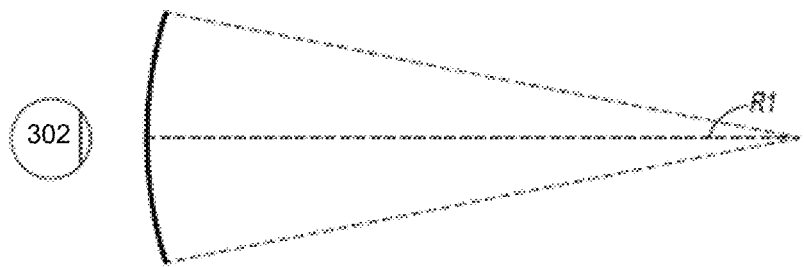
FIGS. 5A-5C illustrate relationships between radius of curvature and focal radius.
Figure 5B:
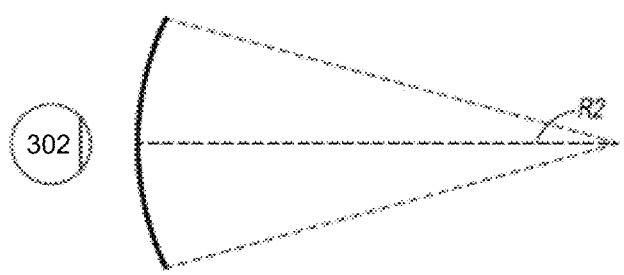
Figure 5C:
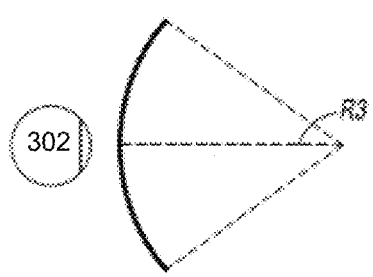

The distance between an object and the eye 302 or 304 can also change the amount of divergence of light from that object, as viewed by that eye. FIGS. 5A-5C illustrate relationships between distance and the divergence of light rays. The distance between the object and the eye 302 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 302. Consequently, at different depth planes, the degree of divergence of light rays is also different, with the degree of divergence increasing with decreasing distance between depth planes and the viewer's eye 302. While only a single eye 302 is illustrated for clarity of illustration in FIGS. 5A-5C and other figures herein, it will be appreciated that the discussions regarding eye 302 may be applied to both eyes 302 and 304 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
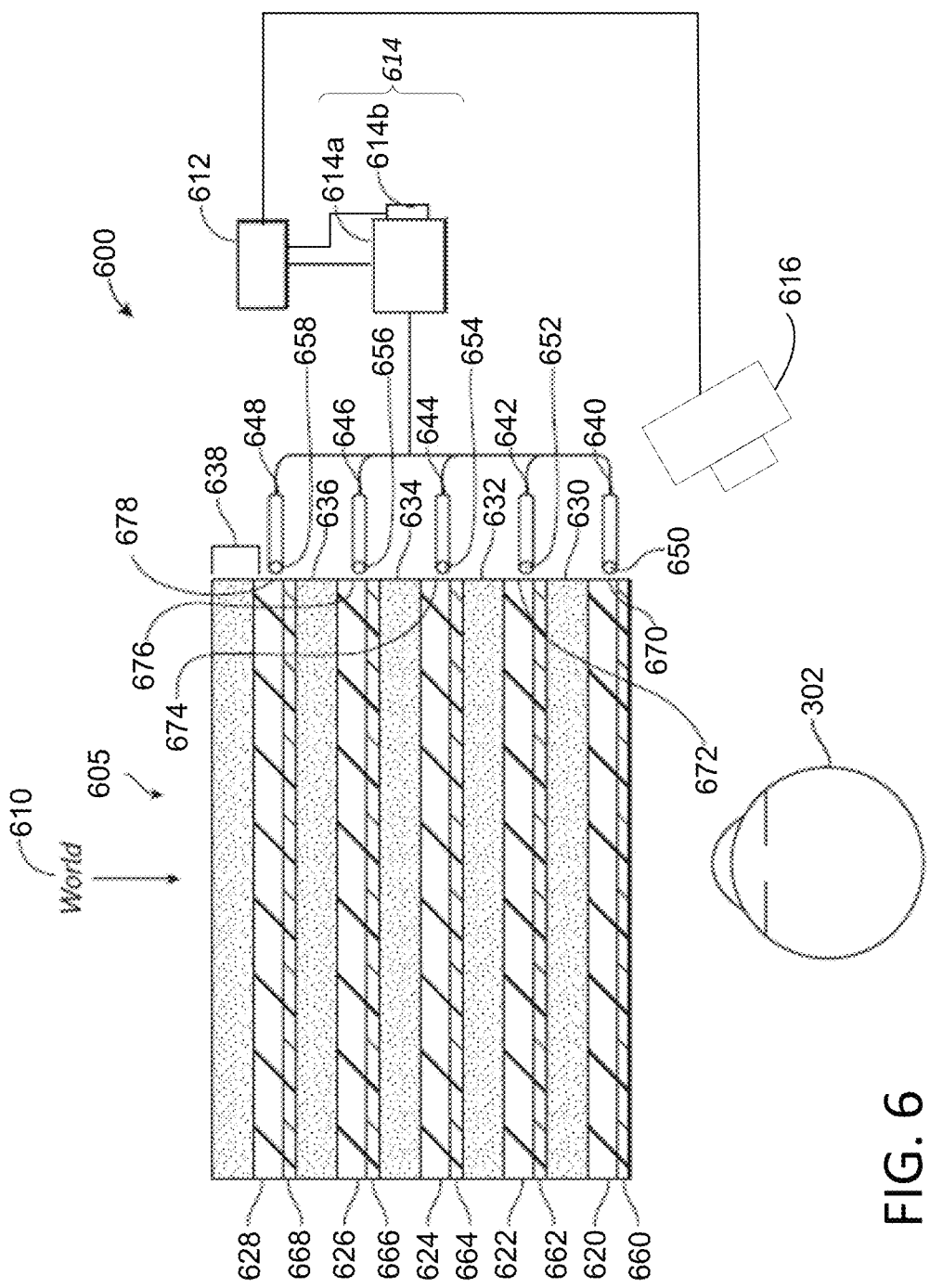
FIG. 6 illustrates an example of a waveguide stack for outputting image information to a user.

FIG. 6 illustrates an example of a waveguide stack for outputting image information to a user. A display system 600 includes a stack of waveguides, or stacked waveguide assembly, 605 that may be utilized to provide three-dimensional perception to the eye/brain using a plurality of waveguides 620, 622, 624, 626, 628. In some embodiments, the display system 600 is the system 200 of FIG. 2, with FIG. 6 schematically showing some parts of that system 200 in greater detail. For example, the waveguide assembly 605 may be part of the display 208 of FIG. 2.

With continued reference to FIG. 6, the waveguide assembly 1240 may also include a plurality of features 630, 632, 634, 636 between the waveguides. In some embodiments, the features 630, 632, 634, 636 may be lenses. The waveguides 620, 622, 624, 626, 628 and/or the plurality of lenses 630, 632, 634, 636 may be configured to send image information to the eye with various levels of wavefront curvature or light ray divergence. Each waveguide level may be associated with a particular depth plane and may be configured to output image information corresponding to that depth plane. Image injection devices 640, 642, 644, 646, 648 may function as a source of light for the waveguides and may be utilized to inject image information into the waveguides 620, 622, 624, 626, 628, each of which may be configured, as described herein, to distribute incoming light across each respective waveguide, for output toward the eye 302. By using different sources the light sources themselves act to switch depth planes by switching on or off the illumination for each depth plane, as desired. Light exits an output surface 650, 652, 654, 656, 658 of the image injection devices 640, 642, 644, 646, 648 and is injected into a corresponding input surface 670, 672, 674, 676, 678 of the waveguides 620, 622, 624, 626, 628. In some embodiments, the each of the input surfaces 670, 672, 674, 676, 678 may be an edge of a corresponding waveguide, or may be part of a major surface of the corresponding waveguide (that is, one of the waveguide surfaces directly facing the world 610 or the viewer's eye 302). In some embodiments, a single beam of light (e.g. a collimated beam) may be injected into each waveguide to output an entire field of cloned collimated beams that are directed toward the eye 302 at particular angles (and amounts of divergence) corresponding to the depth plane associated with a particular waveguide. In some embodiments, a single one of the image injection devices 640, 642, 644, 646, 648 may be associated with and inject light into a plurality (e.g., three) of the waveguides 620, 622, 624, 626, 628.

In some embodiments, the image injection devices 640, 642, 644, 646, 648 are discrete displays that each produce image information for injection into a corresponding waveguide 620, 622, 624, 626, 628, respectively. In some embodiments, for example, the image injection devices 640, 642, 644, 646, 648 comprise scanning fibers or scanning fiber display devices. In some other embodiments, the image injection devices 640, 642, 644, 646, 648 are the output ends of a single multiplexed display which may, e.g., pipe image information via one or more optical conduits (such as fiber optic cables) to each of the image injection devices 640, 642, 644, 646, 648. It will be appreciated that the image information provided by the image injection devices 640, 642, 644, 646, 648 may include light of different wavelengths, or colors (e.g., different component colors).

In some embodiments, the light injected into the waveguides 620, 622, 624, 626, 628 is provided by a light output module 614, which may include a light source, such as backlight 614b. The backlight 614b may comprise one or more emitters such as one or more light-emitting diodes (LEDs). The light from the backlight 614b may be modified by a light modulator 614a, e.g., a spatial light modulator. The light modulator 614a may be configured to change the perceived intensity of the light injected into the waveguides 620, 622, 624, 626, 628. Examples of spatial light modulators include liquid crystal displays (LCD) and a digital light processing (DLP) displays. In some embodiments, the light output module may include one or more light guides, light pipes or reflectors, which are configured to direct light from the emitter (e.g., by transmitting and/or reflecting the light) to the light modulator 614*a*.

A controller 612 controls the operation of one or more of the stacked waveguide assembly 1240, including operation of the image injection devices 640, 642, 644, 646, 648, the light emitter 614*b*, and/or the light modulator 614*a*. In some embodiments, the controller 612 is part of the local data processing module 224. The controller 612 includes programming (e.g., instructions in a non-transitory medium) that regulates the timing and provision of image information to the waveguides 620, 622, 624, 626, 628 according to, e.g., any of the various schemes disclosed herein. In some embodiments, the controller 612 may be configured to control the operations and/or received input from one or more cameras or sensors (e.g., an inward-facing camera) that image an eye of a user, wherein the operation of the light emitter 614*b* and/or light modulator 614*a* may be based at least in part upon images of the eye and/or associated image data, such as the determination of when the eye is blinking or moving. In some embodiments, the controller may be a single integral device, or a distributed system connected by wired or wireless communication channels. The controller 612 may be part of the processing modules or electronics 224 or 228 (FIG. 2) and/or other processing electronics and circuitry in some embodiments.

With continued reference to FIG. 6, the waveguides 620, 622, 624, 626, 628, 190 may be configured to propagate light within each respective waveguide by total internal reflection (TIR). The waveguides 620, 622, 624, 626, 628 may each be planar or have another shape (e.g., curved), with major top and bottom surfaces and edges extending between those major top and bottom surfaces. In the illustrated configuration, the waveguides 620, 622, 624, 626, 628 may each include outcoupling optical elements 660, 662, 664, 666, 628 that are configured to extract light out of a waveguide by redirecting the light propagating within each respective waveguide, out of the waveguide to output image information to the eye 4. Extracted light may also be referred to as outcoupled light and the outcoupling optical elements may also be referred to light extracting optical elements. An extracted beam of light may be outputted by the waveguide at locations at which the light propagating in the waveguide strikes a light extracting optical element. The outcoupling optical elements 660, 662, 664, 666, 628 may, for example, be gratings, including diffractive optical features, as discussed further herein. While illustrated as disposed at the bottom major surfaces of the waveguides 620, 622, 624, 626, 628 for ease of description and drawing clarity, in some embodiments, the outcoupling optical elements 660, 662, 664, 666, 628 may be disposed at the top and/or bottom major surfaces, and/or may be disposed directly in the volume of the waveguides 620, 622, 624, 626, 628, as discussed further herein. In some embodiments, the outcoupling optical elements 660, 662, 664, 666, 628 may be formed in a layer of material that is attached to a transparent substrate to form the waveguides 620, 622, 624, 626, 628. In some other embodiments, the waveguides 620, 622, 624, 626, 628 may be a monolithic piece of material and the outcoupling optical elements 660, 662, 664, 666, 628 may be formed on a surface and/or in the interior of that piece of material.

With continued reference to FIG. 6, as discussed herein, each waveguide 620, 622, 624, 626, 628 is configured to output light to form an image corresponding to a particular depth plane. For example, the waveguide 620 nearest the eye may be configured to deliver collimated light, as injected into such waveguide 620, to the eye 302. The collimated light may be representative of the optical infinity focal plane. The next waveguide up 622 may be configured to send out collimated light which passes through the first lens 630 (e.g., a negative lens) before it can reach the eye 302; such first lens 630 may be configured to create a slight convex wavefront curvature so that the eye/brain interprets light coming from that next waveguide up 622 as coming from a first focal plane closer inward toward the eye 302 from optical infinity. Similarly, the third up waveguide 624 passes its output light through both the first 630 and second 632 lenses before reaching the eye 302; the combined optical power of the first 630 and second 632 lenses may be configured to create another incremental amount of wavefront curvature so that the eye/brain interprets light coming from the third waveguide 624 as coming from a second focal plane that is even closer inward toward the person from optical infinity than was light from the next waveguide up 622.

The other waveguide layers 626, 628 and lenses 634, 636 are similarly configured, with the highest waveguide 628 in the stack sending its output through all of the lenses between it and the eye for an aggregate focal power representative of the closest focal plane to the person. To compensate for the stack of lenses 630, 632, 634, 636 when viewing/interpreting light coming from the world 610 on the other side of the stacked waveguide assembly 605, a compensating lens layer 638 may be disposed at the top of the stack to compensate for the aggregate power of the lens stack 630, 632, 634, 636 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 620, 622, 624, 626, 628 may have the same associated depth plane. For example, multiple waveguides 620, 622, 624, 626, 628 may be configured to output images set to the same depth plane, or multiple subsets of the waveguides 620, 622, 624, 626, 628 may be configured to output images set to the same plurality of depth planes, with one set for each depth plane. This can provide advantages for forming a tiled image to provide an expanded field of view at those depth planes.

With continued reference to FIG. 6, the outcoupling optical elements 660, 662, 664, 666, 628 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 660, 662, 664, 666, 628, which output light with a different amount of divergence depending on the associated depth plane. In some embodiments, the light extracting optical elements 660, 662, 664, 666, 628 may be volumetric or surface features, which may be configured to output light at specific angles. For example, the light extracting optical elements 660, 662, 664, 666, 628 may be volume holograms, surface holograms, and/or diffraction gratings. In some embodiments, the features 630, 632, 634, 636 may not be lenses; rather, they may simply be spacers (e.g., cladding layers and/or structures for forming air gaps).

In some embodiments, the outcoupling optical elements 660, 662, 664, 666, 628 are diffractive features that form a diffraction pattern, or "diffractive optical element" (also referred to herein as a "DOE"). In various embodiments, the DOE's have a sufficiently low diffraction efficiency so that only a portion of the light of the beam is deflected away toward the eye 302 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 302 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
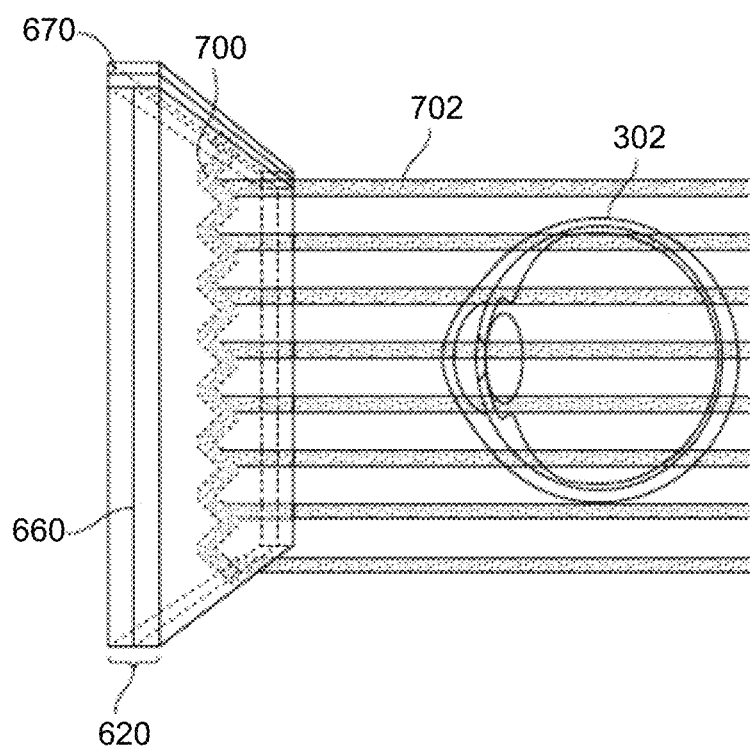
FIG. 7 illustrates an example of exit beams outputted by a waveguide.

FIG. 7 shows an example of exit beams outputted by a waveguide. One waveguide is illustrated, but it will be appreciated that other waveguides in the waveguide assembly 605 may function similarly, where the waveguide assembly 605 includes multiple waveguides. Light 700 is injected into the waveguide 620 at the input surface 670 of the waveguide 620 and propagates within the waveguide 620 by TIR. At points where the light 700 impinges on the DOE 660, a portion of the light exits the waveguide as exit beams 702. The exit beams 7 are illustrated as substantially parallel but, as discussed herein, they may also be redirected to propagate to the eye 302 at an angle (e.g., forming divergent exit beams), depending on the depth plane associated with the waveguide 620. It will be appreciated that substantially parallel exit beams may be indicative of a waveguide with outcoupling optical elements that outcouple light to form images that appear to be set on a depth plane at a large distance (e.g., optical infinity) from the eye 302. Other waveguides or other sets of outcoupling optical elements may output an exit beam pattern that is more divergent, which would require the eye 302 to accommodate to a closer distance to bring it into focus on the retina and would be interpreted by the brain as light from a distance closer to the eye 302 than optical infinity.

Reducing Current Drain

In some embodiments, the display system 600 as discussed above may be powered by a battery. Current drain reduction or power reduction can be desirable in order to provide for more run time from the battery or to reduce heating of the device. In some embodiments, current in the display system 200 may be drawn to light the display of the display system 620 (e.g., using the backlight 614*b*, image injection devices 640, 642, 644, 646, 648 such as possibly one or more scanning fibers or scanning fibers display devices, etc.). In addition, current is employed to control the display (e.g., a graphics processor or driver of the controller 612).

As described herein, some current drain reduction or power reduction can be achieved, for example, by dimming or turning off the display (e.g., dimming or turning off the display backlight), reducing the display update or refresh rate, or dimming or shutting off the display after a time-out period, based on lack of user interaction.

In some embodiments of augmented reality or virtual reality devices, such as described herein, a camera (or other method) may be used to track eye movement. The display system 600 may comprise an inward facing camera 616 directed inward to the face of the user, and in particular, toward the eye of the user (e.g., the eye 302). In some cases, this eye tracking may be done, for example, in order to adjust the view being displayed by the display system 600. For example, the camera 616 may be used to capture images of the eye 302 from which a state or position of the eye pupil or iris can be tracked. The state or position of the eye pupil or iris may be used to determine where the user of the device is looking, allowing for the display to be adjusted accordingly.

In some embodiments, eye tracking can be used to determine if the user's eye is in a state where the user is temporarily unable to see. For example, the user may not be able to see when the user is blinking. In addition, the user may not be able to see when the user's eyes are undergoing a saccade (e.g., a rapid movement of the eyes between fixation points).

In some embodiments, the eye tracking camera or inward facing camera (or other sensor or sensor system) can be used to determine if the user is blinking by determining if the pupil or iris of the user is partially or fully blocked from view. For example, the camera may track the iris of the user's eye as a dark circle within a background (e.g., the eye white of the user). Alternatively, the camera may track the pupil of the user as a darker circle within the iris. When the user is blinking, some or all of the circle defined by the iris or pupil may be obscured or cut off. The controller 612 may "graphically" detect the blink in response to the circle pattern corresponding to the user's iris or pupil being partially or totally missing. For example, in some embodiments, how much of the circle pattern is visible may be compared against a threshold value, wherein the user is determined to be blinking if the amount of visible (e.g., circle) pattern does not meet the threshold value. In some embodiments, the threshold value may be preconfigured based upon user trials.

In some embodiments, the controller 612 may detect whether the user is blinking based upon an amount of contrast calculated from the view of the camera 616. For example, a determination may be made as to whether the contrast meets a threshold value. In some embodiments, when the user's eye is open and the iris or pupil of the user is visible, there may be a high amount of contrast in the images reflected back (e.g., from the eye or combinations of the eye and eyelid) and captured by the camera. On the other hand, when the user's eye is closed (e.g., the user's eyelid covers the eye), the amount of contrast may be much lower compared to when the user's eye is open (e.g., at least partially open). As such, the controller 612 may detect a blink when the contrast is lower than the threshold value.

In some embodiments, if the controller 612 is unable to detect a position of the iris or pupil of the user. For example, the controller 612 may generate an "error" state if the iris or pupil of the user is unable to be detected, which may also serve as a blink detection.

In some embodiments, the controller 612 may detect a saccade by the user. When the user's eyes are in a state of saccade, the user may not perceive any visual information despite the user's eyes being open. In some embodiments, the controller 612 may detect a saccade by using the inward facing camera 616 to track a location of the user's iris or pupil (e.g., as a dark circle, as discussed above). If movement of the user's iris or pupil above a certain rate is detected, then the user may be considered to be in a saccade state.

In some embodiments, a time period of a blink or saccade may be a predetermined period of time. The predetermined period of time may be determined based upon empirical data from user studies. In some embodiments, a time period for a blink or saccade may be measured by one or more sensors of the display system 600 (e.g., the inward facing camera 616) based upon eye open/closed criteria or eye movement criteria as discussed above. If the eye is closed or experiencing saccades for a period of time, the system may be set to a lower energy state to conserve power.

Although the above discussion refers primarily to using a camera to determine a state where the user is unable to see (e.g., due to a blink or saccade), any type of hardware that can be used to detect a state of the user's eye may be used, such as other types of sensor systems. In some cases, it may be desirable to utilize hardware already integrated with display system 600 (e.g., hardware designed to serve other purposes in the display system 600), in order to reduce power consumption that would be consumed by the addition of new hardware. The camera or other type of sensor system is not limited to using visible light and may employ infrared (IR) light.

In some embodiments, the display system 600 may reduce its current or power drain during the period when the user is unable to see (e.g., due to a blink or saccade). For example, current drain or power usage of the display can be reduced by employing one or more current drain or power reduction techniques, which may include dimming or turning off a light source for the display (e.g., a backlight) associated with the display. In some embodiments, the light source (e.g., backlight) 614b of the display system 600 may be dimmed or turned off. In other embodiments (e.g., display systems using OLED displays that do not have a backlight), current drain or power usage may be reduced by dimming or turning off one or more active pixels of the display. Other types of display components or displays may be turned off, dimmed or set to a lower power consumption mode when the eye cannot see (e.g., during a blink or saccades).

In alternative or combination, a graphics driver or processor or processing electronics associated with the display "skips" a number of frames or waits for a designated period of time where the graphics driver is in a state that causes less power to be consumed than if providing new images or refreshing images. For example, the graphics driver can cause the graphics processor to suspend refreshing a displayed image, or reduce a refresh rate of the display, thus consuming less power in comparison to normal operation. In some implementations, the number of frames or period of time during which current drain is reduced may be configured to correspond to a length of the blink or saccade. The time period for a blink, for example, is typically between 100 to 400 mSec.

It is understood that any of the current drain reduction techniques discussed herein may be performed independently or in combination with each other. For example, in some embodiments, in response to the detection of a blink or saccade, the controller 612 may dim the backlight 614b as well as cause the graphics drive to skip a designated number of frames. In other embodiments, the controller 612 may cause the graphics driver to skip a designated number of frames without dimming the backlight 614b, or vice versa.

Figure 8:
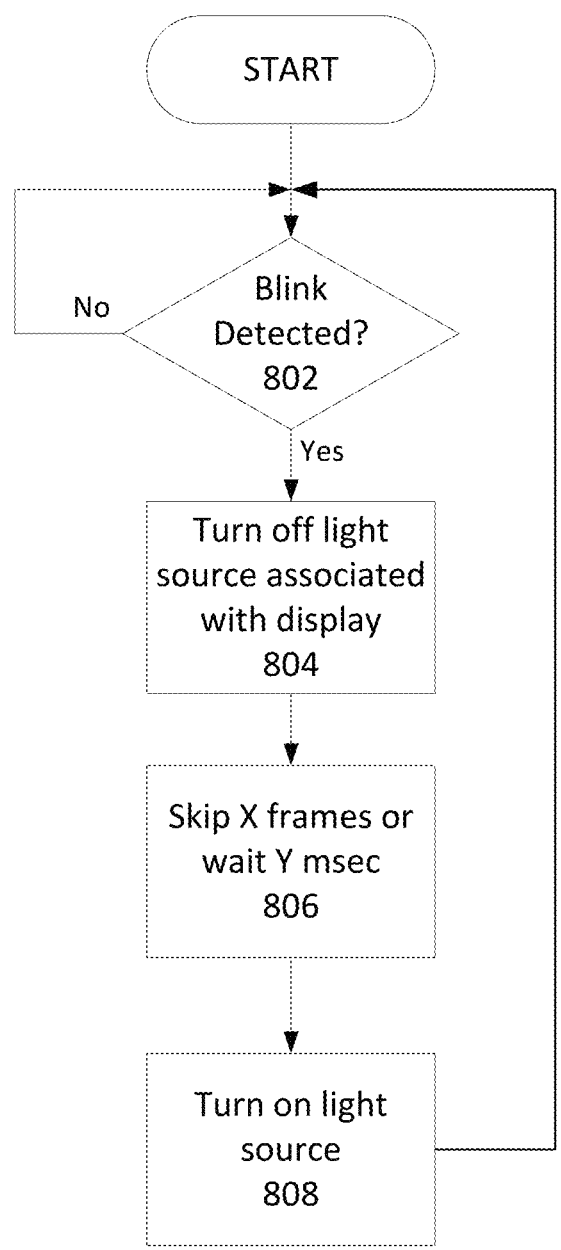
FIG. 8 illustrates a flowchart of a process for reducing current drain of the display system.

FIG. 8 illustrates a flowchart of an example process for reducing current draining or power usage, in accordance with some embodiments. Any portion of this flowchart may be executed by electronics such as processing electronics or circuitry. At block 802, a determination is made as to whether a state when a user of the display system is unable to see is detected (e.g., a blink or saccade by the user). In some embodiments, this may be done using an eye tracking or inward facing camera or other sensor or sensor system that determines whether the pupil or iris of the user is blocked from view or is experiencing rapid movement. If a blink or saccade is detected, the process may proceed to block 804. Otherwise, the process may continue to monitor the eye, for example, to detect for a blink or saccade by the user of the display system.

At block 804, a light source associated with the display is dimmed or turned off. For example, the light source may be configured to enter a low power mode or be disabled. In some embodiments, the light source may comprise the backlight 614b. In other embodiments, the light source may comprise a plurality of active pixels of the display (e.g., of an OLED display). Other light sources and display configurations are possible.

At block 806, a graphics driver associated with the display system may reduce an amount of power consumed. For example, the graphics driver may skip X number of frames or wait for a period of time Y, wherein X and Y are determined based upon a period of a blink (e.g., between 100 and 400 mSec) or saccade. In some embodiments, the graphics driver may reduce a refresh rate of the display.

At block 808, the light source associated with the display (e.g., the backlight 614b, active pixels of the display, and/or the like) or other components of the display is turned back on or un-dimmed, and the display system resumes normal operation. It is understood that the process illustrated in this flowchart is an example, and that steps may be excluded, added, and/or reordered.

It is understood that although FIG. 8 illustrates both dimming/turning off a light source associated with the display (blocks 804, 808) and reducing a power consumption of a graphics driver or processor (block 806), in other embodiments, the display system 600 may perform any combination of current drain or power reduction techniques. For example, in some embodiments, the display system 600 may perform only dimming/turning off the light source of the display, only reducing a power consumption of the graphics driver or processor (e.g., skipping frames, reducing a refresh rate, and/or the like), or both. Power conservation can also come from other components. For example, setting the spatial light modulator or one or more scanning fibers or scanning fiber display devices to a lower power state can also reduce power consumption.

The average person blinks about once every 2 to 10 seconds, for a period of 100 to 400 msec. Thus, in a less frequent scenario, the eyes are closed for about 1% of the time. For a more typical scenario, the eyes will be closed for 2% to 5% of the time. Therefore a reduction of a few percent can possibly be achieved in the current drain associated with lighting the display using a light source (e.g., a backlight or active pixels) and/or the graphics driver/processor.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention. For example, while advantageously utilized with AR displays that provide images across multiple depth planes, the augmented reality content disclosed herein may also be displayed by systems that provide images on a single depth plane.

Many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with patents and publications generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A display system with reduced power use, the display system comprising:
   an inward-facing sensor;
   a head-mounted display configured to be worn by a user and disposed on a frame configured to support said display thereon, said display configured to project light into said user's eye to display augmented reality image content to the user's vision field, at least a portion of said display being transparent and disposed at a location in front of the user's eye when the user wears the frame such that said transparent portion transmits light from a portion of an environment in front of the user and said head-mounted display to the user's eye to provide a view of said portion of the environment in front of the user and said head-mounted display; and
   processing electronics in communication with the inward-facing sensor and the display, the processing electronics configured to:
      detect a first change in a user's eye status using the inward-facing sensor, the first change comprising an indication associated with a closed state of the user's eyes,
      detect a second change in a user's eye status, the second change comprising an indication associated with an open state of the user's eyes, and
      reduce a current drain of the display system in response to the change in the user's eye status, wherein reducing the current drain of the display comprises configuring a graphics driver associated with the display to reduce an amount of power consumed by the display over multiple frames without turning off the display.

2. The display system of claim 1, wherein the display comprises a light source, and wherein reducing the current drain of the display further comprises dimming the light source of the display.

3. The display system of claim 1, wherein the graphics driver is configured to skip a designated number of frames, the designated number of frames based upon a length of time that the user is unable to see.

4. The display system of claim 1, wherein the processing electronics is configured to reduce the current drain of the display by reducing a refresh rate associated with the display.

5. A method for reducing power use of a display system, comprising:
   detecting a first change in a user's eye status using an inward facing sensor, the first change comprising an indication associated with a closed state of the user's eyes,
   detecting a second change in a user's eye status, the second change comprising an indication associated with an open state of the user's eyes,
   reducing a current drain of the display system in response to detecting the first change in the user's eye status, wherein reducing the current drain of the display comprises configuring a graphics driver associated with a display to reduce an amount of power consumed by the display over multiple frames without turning off the display, and increasing a current drain of the display system in response to detecting the second change in the user's eye status.

6. The method of claim 5, wherein the first and second changes in the user's eye status corresponds to a blink.

7. The method of claim 5, wherein reducing the current drain of the display further comprises turning off a light source.

8. The method of claim 5, wherein reducing the current drain of the display further comprises dimming a light source of the display.

9. The method of claim 5, wherein the graphics driver is configured to skip a designated number of frames, the designated number of frames based upon a length of time that the user is unable to see.

10. The method of claim 5, wherein the graphics driver is configured to further reduce the current drain of the display by reducing a refresh rate associated with the display.

11. A method for reducing power use of a display system, comprising:

detecting a first change in a user's eye status using an inward-facing sensor, the first change comprising an indication associated with a closed state of the user's eyes, detecting a second change in a user's eye status, the second change comprising an indication associated with an open state of the user's eyes, reducing a current drain of the display system in response to detecting the first change in the user's eye status, wherein reducing the current drain of the display comprises skipping a designated number of frames without turning off the display, the designated number of frames based upon a length of time that the user is unable to see, and increasing a current drain of the display system in response to detecting the second change in the user's eye status.

12. The method of claim 11, wherein the first and second changes in the user's eye status corresponds to a blink.

13. The method of claim 11, wherein reducing the current drain of the display further comprises turning off a light source.

14. The method of claim 11, wherein reducing the current drain of the display further comprises dimming a light source of the display.

15. The method of claim 11, wherein reducing the current drain of the display further comprises configuring a graphics driver associated with the display to reduce an amount of power consumed by the display.

16. The method of claim 11, wherein reducing the current drain of the display further comprises reducing the current drain of the display by reducing a refresh rate associated with the display.

17. A display system with reduced power use, comprising:
an inward-facing sensor;
a display; and
processing electronics in communication with the inward-facing sensor and the display, the processing electronics configured to:
detect a first change in a user's eye status using the inward-facing sensor, the first change comprising an indication associated with a closed state of the user's eyes, detect a second change in a user's eye status, the second change comprising an indication associated with an open state of the user's eyes, reduce a current drain of the display system in response to detecting the first change in the user's eye status, wherein reducing the current drain of the display comprises skipping a designated number of frames without turning off the display, the designated number of frames based upon a length of time that the user is unable to see, and increase a current drain of the display system in response to the detected second change in the user's eye.

18. The display system of claim 17, wherein the first and second changes in the user's eye status corresponds to a blink.

19. The display system of claim 17, wherein reducing the current drain of the display further comprises turning off a light source.

20. The display system of claim 17, wherein reducing the current drain of the display further comprises dimming a light source of the display.

21. The display system of claim 17, wherein reducing the current drain of the display further comprises configuring a graphics driver associated with the display to reduce an amount of power consumed by the display.

22. The display system of claim 17, wherein the processing electronics is further configured to reduce the current drain of the display by reducing a refresh rate associated with the display.

23. A method for reducing power use of a display system, comprising:

detecting a first change in a user's eye status using an inward-facing sensor, the first change comprising an indication associated with a closed state of the user's eyes, detecting a second change in a user's eye status, the second change comprising an indication associated with an open state of the user's eyes, reducing a current drain of the display system in response to detecting the first change in the user's eye status, wherein reducing the current drain of the display comprises reducing a refresh rate associated with the display without turning off the display, and increasing a current drain of the display system in response to detecting the second change in the user's eye status.

24. The method of claim 23, wherein the first and second changes in the user's eye status corresponds to a blink.

25. The method of claim 23, wherein reducing the current drain of the display further comprises turning off a light source.

26. The method of claim 23, wherein reducing the current drain of the display further comprises dimming a light source of the display.

27. The method of claim 23, wherein reducing the current drain of the display further comprises configuring a graphics driver associated with the display to reduce an amount of power consumed by the display.

28. The method of claim 27, wherein the graphics driver is configured to skip a designated number of frames, the designated number of frames based upon a length of time that the user is unable to see.

29. A display system with reduced power use, comprising:
an inward-facing sensor;
a display; and
processing electronics in communication with the inward-facing sensor and the display, the processing electronics configured to:
- detect a first change in a user's eye status using the inward-facing sensor, the first change comprising an indication associated with a closed state of the user's eyes,
- detect a second change in a user's eye status, the second change comprising an indication associated with an open state of the user's eyes,
- reduce a current drain of the display system in response to detecting the first change in the user's eye status, wherein reducing the current drain of the display comprises reducing a refresh rate associated with the display without turning off the display, and
- increase a current drain of the display system in response to the detected second change in the user's eye status.

30. The display system of claim 29, wherein the first and second changes in the user's eye status corresponds to a blink.

31. The display system of claim 29, wherein reducing the current drain of the display further comprises turning off a light source.

32. The display system of claim 29, wherein reducing the current drain of the display further comprises dimming a light source of the display.

33. The display system of claim 29, wherein reducing the current drain of the display further comprises configuring a graphics driver associated with the display to reduce an amount of power consumed by the display.

34. The display system of claim 33, wherein the graphics driver is configured to skip a designated number of frames, the designated number of frames based upon a length of time that the user is unable to see.

35. The display system of claim 1, wherein determining a first change in a user's eye status comprises monitoring images of the iris or pupil obtained by the inward-facing sensor or monitoring contrast in images of the user's eye obtained by the inward-facing sensor.

36. The method of claim 5, wherein determining a first change in a user's eye status comprises monitoring images of the iris or pupil obtained by the inward-facing sensor or monitoring contrast in images of the user's eye obtained by the inward-facing sensor.

37. The method of claim 11, wherein determining a first change in a user's eye status comprises monitoring images of the iris or pupil obtained by the inward-facing sensor or monitoring contrast in images of the user's eye obtained by the inward-facing sensor.

38. The display system of claim 17, wherein determining a first change in a user's eye status comprises monitoring images of the iris or pupil obtained by the inward-facing sensor or monitoring contrast in images of the user's eye obtained by the inward-facing sensor.

39. The method of claim 23, wherein determining a first change in a user's eye status comprises monitoring images of the iris or pupil obtained by the inward-facing sensor or monitoring contrast in images of the user's eye obtained by the inward-facing sensor.

40. The display system of claim 29, wherein determining a first change in a user's eye status comprises monitoring images of the iris or pupil obtained by the inward-facing sensor or monitoring contrast in images of the user's eye obtained by the inward-facing sensor.

41. The method of claim 15, wherein configuring the graphics driver associated with the display to reduce an amount of power consumed by the display comprises reducing an amount of power consumed by the display over multiple frames.

42. The display system of claim 21, wherein configuring the graphics driver associated with the display to reduce an amount of power consumed by the display comprises reducing an amount of power consumed by the display over multiple frames.

43. The method of claim 27, wherein configuring the graphics driver associated with the display to reduce an amount of power consumed by the display comprises reducing an amount of power consumed by the display over multiple frames.

44. The display system of claim 33, wherein configuring the graphics driver associated with the display to reduce an amount of power consumed by the display comprises reducing an amount of power consumed by the display over multiple frames.

* * * * *